United States Patent [19]

Scobie

[11] Patent Number: 5,044,257
[45] Date of Patent: Sep. 3, 1991

[54] ROTARY ACTUATOR AND METHOD FOR FORMING A ROTARY PISTON

[75] Inventor: William B. Scobie, Houston, Tex.

[73] Assignee: Keystone International Holdings Corp., Houston, Tex.

[21] Appl. No.: 496,352

[22] Filed: Mar. 20, 1990

[51] Int. Cl.$^5$ .............. F01C 9/00; F01B 11/02; B28B 1/02

[52] U.S. Cl. .................. 92/120; 92/170.1; 92/248; 29/888.047; 264/269; 264/310

[58] Field of Search .............. 92/120, 169.1, 170.1, 92/248; 29/888.047, 888.044, 434, 527.6; 264/269, 267, 242, 274, 275, 310

[56] References Cited

U.S. PATENT DOCUMENTS

| | | | |
|---|---|---|---|
| 1,512,313 | 10/1924 | Rowe | 264/269 X |
| 2,997,026 | 8/1961 | Zimmerer | 92/169.1 X |
| 3,070,075 | 12/1962 | Hanselmann | 92/120 |
| 3,246,580 | 4/1966 | Huska | 92/120 |
| 3,312,149 | 4/1967 | Fleckenstein et al. | 92/170.1 |
| 3,520,969 | 7/1970 | Smith | 264/275 X |
| 4,099,659 | 7/1978 | Grimaldi, Jr. | 92/120 X |
| 4,600,548 | 7/1986 | Nenna | 264/269 X |
| 4,628,797 | 12/1986 | Kendall | 92/120 |
| 4,765,938 | 8/1988 | Schmidt et al. | 264/269 |

FOREIGN PATENT DOCUMENTS

| | | | |
|---|---|---|---|
| 0513018 | 10/1952 | Belgium | 92/120 |
| 0621576 | 8/1978 | U.S.S.R. | 264/269 |
| 0434221 | 8/1935 | United Kingdom | 264/269 |
| 0861030 | 2/1961 | United Kingdom | 264/269 |

*Primary Examiner*—Edward K. Look
*Assistant Examiner*—John Ryznic
*Attorney, Agent, or Firm*—Browning, Bushman, Anderson & Brookhart

[57] ABSTRACT

Improved techniques are provided for manufacturing a toroidal arc segment piston for use in a fluid pressure responsive rotary actuator, and for forming an actuator housing defining an arcuate chamber for receiving a rotary actuator piston. A moldable polymeric material is positioned within an arcuate master chamber in a piston-forming fixture, and a metal piston core is rotatably mounted to the fixture. The piston core is rotated to displace the polymeric material and form a sheath about the piston core. After curing, the piston core and sheath are rotated out of the arcuate master chamber, and are installed in a rotary actuator housing. A master piston may similarly be used to form a polymeric lining which defines the chamber for receiving the piston in the actuator housing.

20 Claims, 7 Drawing Sheets

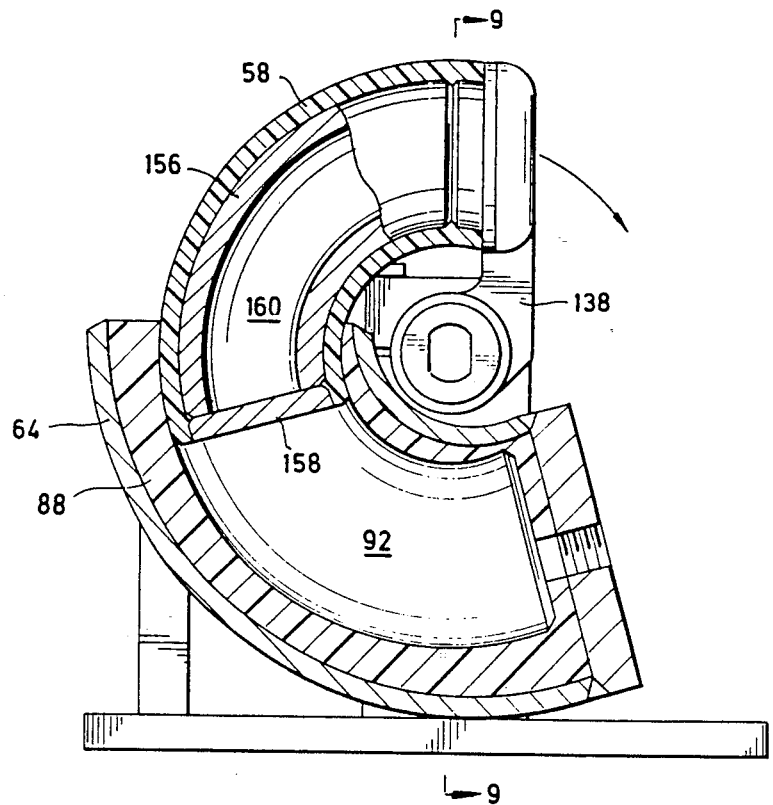
FIG. 8
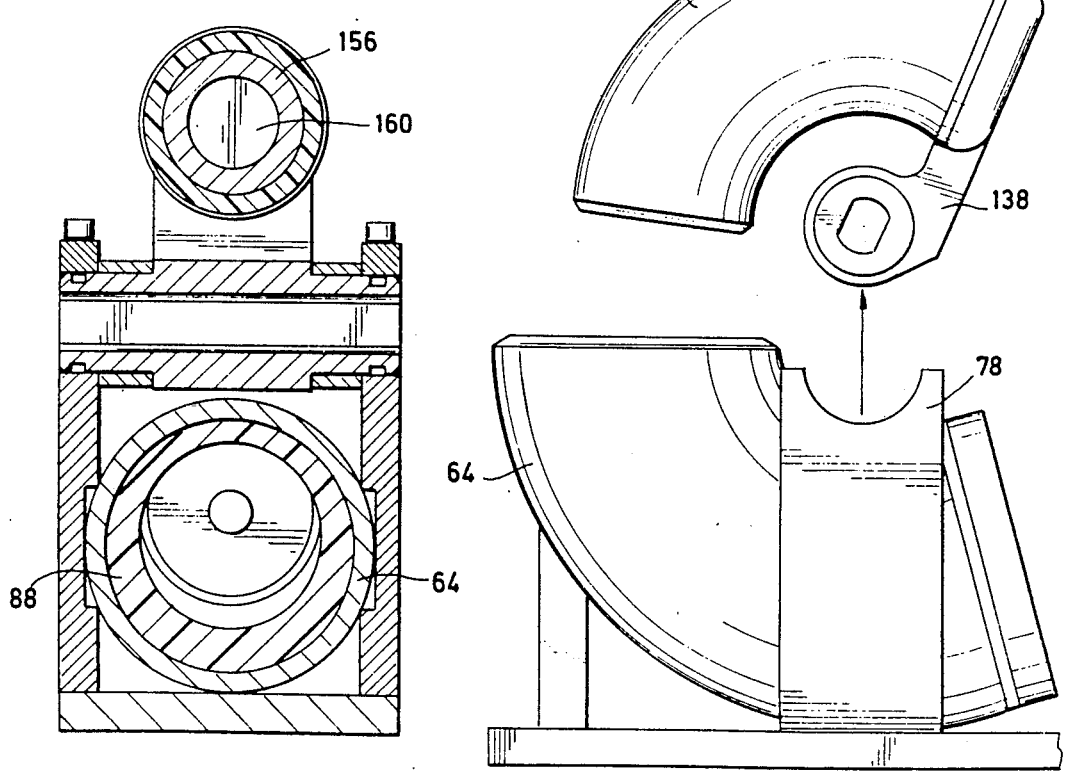
FIG. 9
FIG. 10

ROTARY ACTUATOR AND METHOD FOR FORMING A ROTARY PISTON

BACKGROUND OF THE INVENTION

1. Field of the Invention

The present invention relates to rotary actuators and to the method of manufacturing rotary actuators. More particularly, the invention relates to an improved toroidal arc segment piston for a rotary actuator, to an improved method of forming such a piston, and to an improved method of forming an arcuate chamber in the rotary actuator housing for receiving the piston.

2. Description of the Background

Rotary actuators have previously been proposed to rotate a shaft about a fixed axis. Hydraulic or pneumatic fluid pressure may be applied to a rotary actuator to displace a piston within a chamber in the actuator housing and thereby directly effect rotation of the shaft connected to the piston. In a typical application, a rotary actuator has been proposed to open or close a butterfly valve. The valves may be installed in remote locations, and accordingly high reliability for the fluid pressure responsive actuator is required.

Almost all actuators used to rotate a valve stem and thereby control flow of fluid through a valve employ a piston which is linearly movable within the actuator housing. Such actuators may employ a rack and pinion mechanism, a scotch yoke assembly, a crank arm mechanism, or a hydraulic gear to convert the linear piston motion to rotary movement of a shaft. These motion conversion mechanisms represent a significant portion of the cost, weight and size of a rotary actuator, but are considered necessary to achieve the desired rotary operation based or linear movement of the fluid responsive piston.

A rotary actuator has previously been proposed which comprises a housing defining a chamber having a generally toroidal arc segment configuration. A similarly-shaped piston or torus oscillates within the housing chamber, and an arm structurally connects the piston and a shaft journaled within the housing. Fluid pressure is used to displace the piston within the housing and rotates the shaft in one direction, while either a spring or fluid pressure acting on an opposing end of the piston may be used to effect rotation in the opposite direction. A seal is provided to maintain fluid-tight engagement between the piston and the housing during piston reciprocation, and may be mounted on either the piston or the housing.

Those skilled in the actuator art have long appreciated the significant problems and high costs associated with manufacturing direct-acting rotary actuators which utilize rotary rather than linear piston movement, and with obtaining a reliable seal between the toroidal-shaped piston and the interior walls of the housing which define the receiving cavity for the piston. To reduce manufacturing costs, the housing is conventionally of a split body design, so that housing half sections are joined together along a plane which is perpendicular to the actuator shaft and passes through and splits the toroidal arc segment chamber into similar halves. If the seal is provided on the piston, the seal continuously engages this split housing seam, which greatly reduces seal life and actuator reliability. Accordingly, the housing/piston seal is often provided within a slot in the housing which encircles the chamber. In this case, the seal is thus stationary on the housing and engages the reciprocating rotary piston.

The problem is further compounded, however, because of the high costs associated with manufacturing a toroidal arc segment piston within the tolerances necessary to maintain fluid tight engagement with the stationary seal. In order to satisfy strength and shock resistant requirements, the rotary piston is preferably fabricated from metal. The surfaces on the piston need to be concentric with respect to the axis of the actuator shaft, and complicated and expensive NC machining techniques are generally proposed to provide dimensions within the desired tolerances. Moreover, the desired tolerances between the shaft and the piston sealing surfaces are affected by the attachment of the arm to the piston. Securing the arm to the piston prior to final machining of the piston sealing surfaces further complicates the machining operation. Alternatively, the machining tolerances for the arm may be closely controlled, and the variance or play introduced by the arm to piston attachment technique considered so that the rotary piston may reliably seal with the actuator housing.

One technique for reducing the cost of manufacturing a toroidal arc segment piston for a rotary actuator is disclosed in the U.S. Pat. No. 4,817,213. Improved techniques are required, however, to further reduce the cost of manufacturing a rotary piston, and to maintain a reliable seal between the piston and the actuator housing. The disadvantages of the prior art are overcome by the present invention, and improved methods and apparatus are hereinafter disclosed for efficiently manufacturing a rotary actuator, and for obtaining a highly reliable seal between the actuator housing and the rotary piston.

SUMMARY OF THE INVENTION

It is an object of the present invention to provide improved techniques for forming a toroidal arc segment piston for sealing engagement with chamber walls in a rotary actuator.

Another object of the invention is to provide an improved rotary actuator including a novel toroidal arc segment piston.

It is yet a further object of this invention to provide improved techniques for efficiently forming a rotary actuator housing with a seamless toroidal arc segment chamber therein for receiving a rotary piston.

In one embodiment of the invention, the toroidal arc segment piston is formed from a metal core and an outer sheath of a moldable material. To form the moldable sheath on the piston, a fixture is provided with a generally arcuate chamber, and a mold-forming material is placed within the fixture chamber. A master piston/arm assembly is rotated about the fixture to position the master piston within the chamber and displace the mold-forming material about the master piston. After curing, the master piston is rotated out of the fixture, thereby defining a master piston chamber within the fixture. A production arm and piston core are cast from metal as a unit, and the arm is machined for rotation within the rotary actuator housing. The metal arm and piston core are then rotatably mounted to the fixture, a moldable material placed within the master piston chamber, and the production piston core rotated into the master piston chamber to displace the moldable material and form a sheath about the piston core. After curing, the metal core and molded sheath are rotated out the master piston chamber, and the produced piston and unitary arm may be mounted within a piston-receiving arcuate chamber in a rotary actuator housing. The master piston chamber within the fixture is able to successively form multiple production arm and piston core assemblies.

In another embodiment, the actuator comprises a production housing which defines a generally arcuate chamber for receiving a piston. During manufacture of the rotary actuator housing, a master piston/arm assembly is rotatably mounted about the production housing, and a moldable material is placed within the generally arcuate chamber. The rotation of the master piston within the chamber displaces the moldable material about the master piston, thereby forming a molded lining which defines a precise toroidal arc segment cavity within the housing. After curing, the master piston/arm assembly is removed for use in another production housing. A production piston carrying an annular seal for engagement with the moldable lining may then be positioned within the housing, and an arm secures the piston to the actuator shaft.

These and further objects of the present invention will become apparent from the following detailed description, wherein reference is made to the figures in the accompanying drawings.

BRIEF DESCRIPTION OF THE DRAWINGS

FIG. 8 is a pictorial view, partially in cross-section, illustrating removal of another embodiment of a rotary actuator piston from the fixture.

FIG. 9 is a cross-sectional view taken along lines 9—9 of the FIG. 8

FIG. 10 is a pictorial view illustrating detachment of the toroidal arc segment piston from the fixture.

DETAILED DESCRIPTION OF PREFERRED EMBODIMENTS

A rotary actuator according to the present invention is responsive to pressurized fluid to cause torqued rotation of an actuator shaft. The actuators may either be single-acting or double-acting, although only double-acting actuators are described in detail below. In the former case, pressurized fluid rotates the shaft in one direction and a spring or other mechanical biasing device rotates the shaft in the opposing direction upon the release of fluid pressure to the actuator. In the latter case the controlled application of pressurized fluid is used to rotate the piston and thus the shaft connected thereto in both the forward and reverse directions. Although rotary actuators have various uses, in an exemplary application the actuator shaft is an extension of or is coupled directly to a valve stem, and the rotary actuator may thus be used to control opening and closing of a valve by rotating the actuator shaft through a 90° arc.

Figure 1:
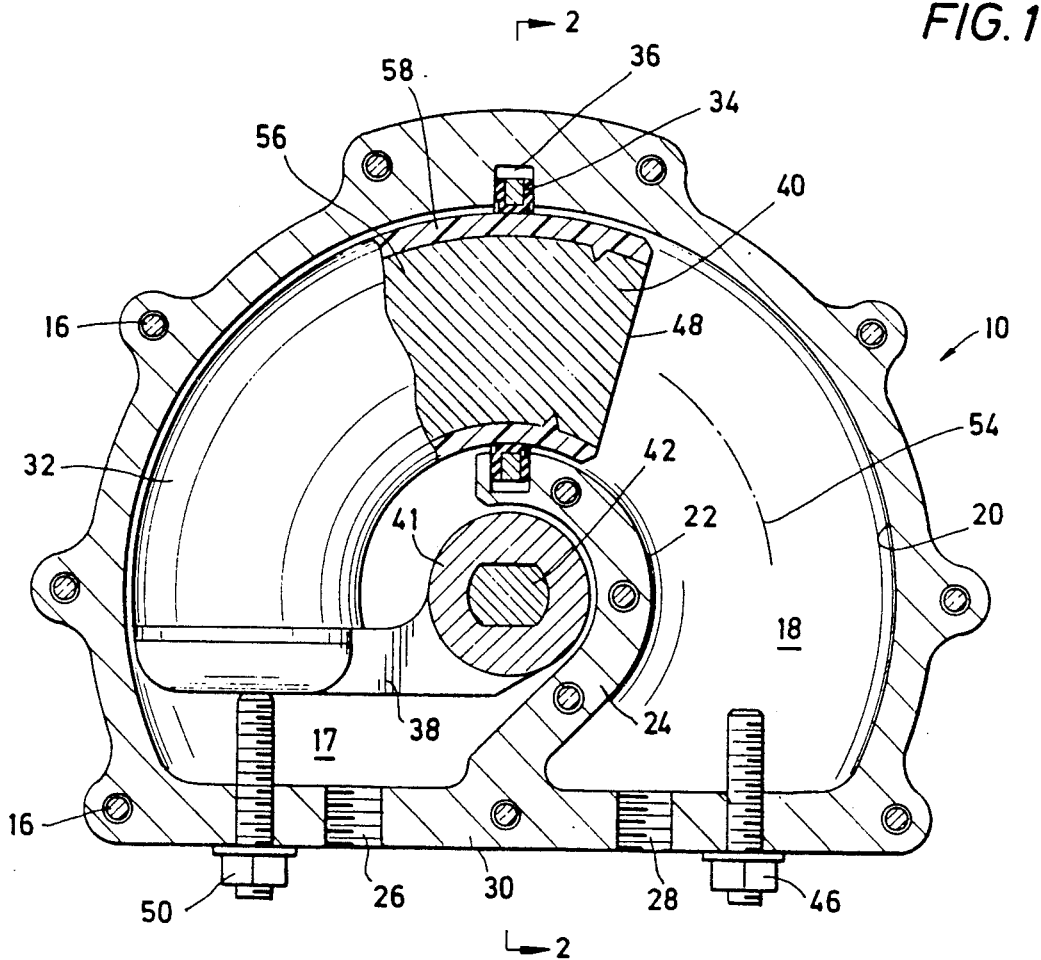
FIG. 1 is a pictorial view, partially in cross-section, of one embodiment of a rotary actuator according to the present invention.
Figure 2:
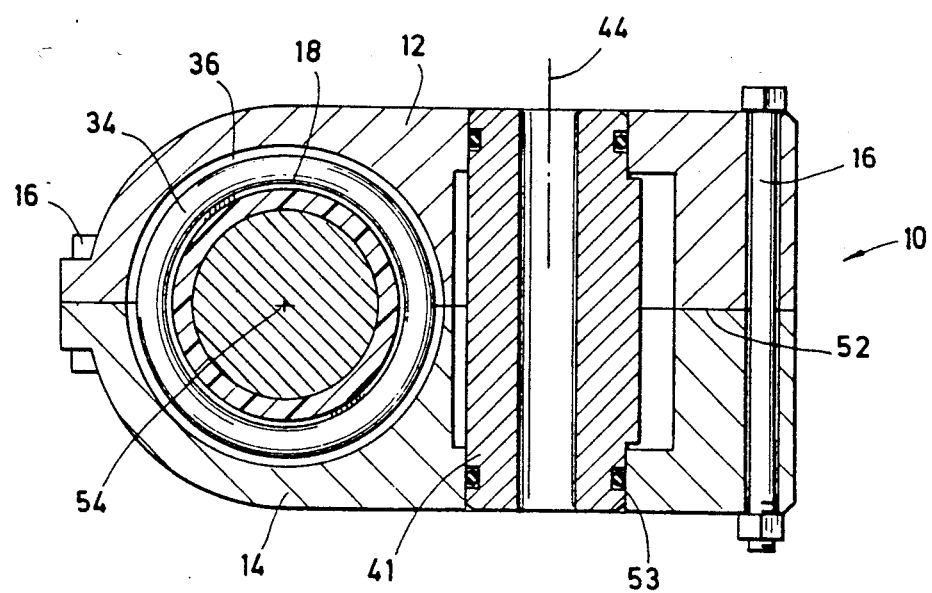
FIG. 2 is a cross-sectional view taken along lines 2—2 in FIG. 1.

FIGS. 1 and 2 depict a suitable rotary actuator 10 including substantially identical housing portions 12 and 14, which are secured together by a plurality of bolt and nut assemblies 16. The housing portions form an internal cavity 17, which includes a generally arcuate chamber 18 formed by the internal walls 20 of the housing portions and an opposing wall 22 of the wing portion 24. The arcuate chamber 18 has a toroidal arc segment configuration, and may have a circular cross-section, as shown in FIG. 2, or a generally oval or elliptical cross-section. The double-acting actuator includes a pair of fluid input ports 26, 28 each extending through planar portion 30 of the housing for inputting pressurized fluid to the actuator.

Rotary piston 32 also has a toroidal arc segment configuration. Annular seal 34 is provided within slot 36 in the housing for continual sealing engagement with the external sealing surface of the piston 32 during reciprocation of the piston within the housing. Accordingly, the piston 32 is also shown with a circular cross-sectional configuration. One end of the piston 32 is connected to arm 38, while the cantilevered or free end 40 of the piston rotates within the chamber 18. The arm 38 is fixedly mounted on actuator shaft 42, which as previously noted may be an extension of a valve stem. Arm 38 and piston 32 thus rotate about the axis 44 of the valve stem. An adjustable stop 46 is provided on the housing for engagement with the end surface 48 of the rotary piston 32 to control rotational travel of the shaft 42, while a similar adjustable stop 50 is provided for engaging the arm 38 and thus limiting opposing rotation of the piston and the shaft interconnected therewith.

The housing portions 12, 14 may be manufactured such that their mating surfaces define a planar seam 52. Seam 52 is perpendicular to the axis 44 of the shaft, and the centerline 54 of the arcuate chamber 18 lies within the plane of seam 52. Suitable gasketing (not shown) or other sealing means may be used to maintain a fluid-tight seal between the housing portions 12 and 14. 0-ring seals 53 provide the desired seal between the rotating arm 38 and the housing portions. The application of fluid pressure to port 26 rotates the piston shown in FIG. 1 in the clockwise direction, while the release of fluid pressure at port 26 and the application of pressurized fluid to port 28 rotates the piston 32 in the counterclockwise direction.

The piston 32 comprises a metal core 56 and an outer sheath or sleeve 58 of a polymeric material. The arm 38 may be bolted, keyed, pinned, welded or otherwise fixed to the core 56, although preferably the core 56 is solid, and the arm 38 and core 56 are monolithically cast. After casting, the arm 38 may be machined according to conventional techniques to form a trunnion 41 having an outer cylindrical surface for engagement with the housing. Trunnion 41 is also machined to accommodate the 0-rings seals 53, and to receive the actuator shaft 42 therein. After machining, a polymeric sheath 58 may be efficiently formed about the piston core, which requires little or no machining. A significant advantage of the rotary piston 32 of the present invention is that its outer layer 56 is formed by a transfer molding process as explained below, so that the sealing surfaces of the piston may obtain their desired concentricity with respect to the axis 44 at a substantially reduced cost. Also, by casting the arm 38 and the piston core 56 as a unit, variations otherwise caused by the assembly of these components are eliminated. Finally, since the arm 38 is initially machined to rotate within the actuator housing, the machined cylindrical surface 41 may be used to thereafter accurately mold the sheath 58 on the piston core 56.

Figure 3:
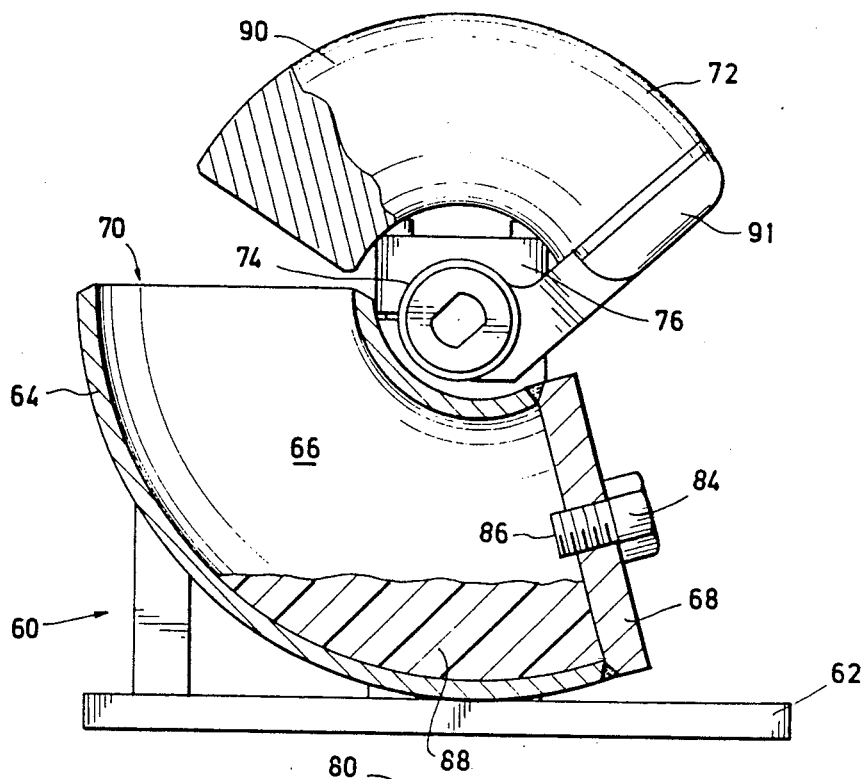
FIG. 3 is a pictorial view, partially in cross-section, illustrating a fixture having a mold-forming material therein and a master piston/arm assembly mounted thereto.
Figure 5:
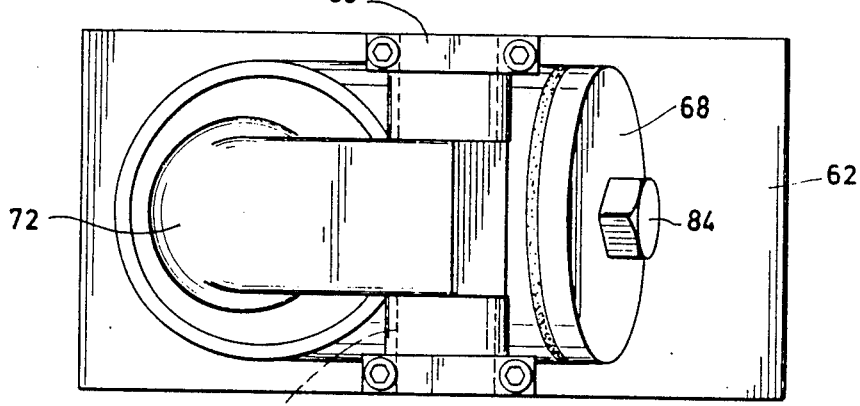
FIG. 5 is a top view of the fixture shown in FIG. 4.
Figure 4:
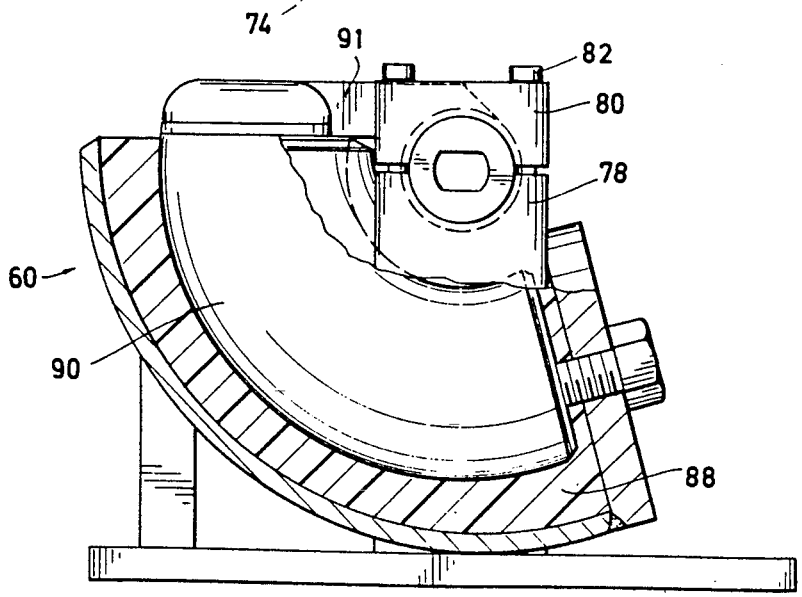
FIG. 4 is a pictorial view, partially in cross-section, of the fixture shown in FIG. 3 with the master piston/arm assembly rotated for forming a master piston cavity within the fixture.

FIGS. 3-5 depict a fixture 60 having a base 62 and a bent tubular-shaped member 64 mounted on the base. Member 64 has a generally arcuate cavity 66 therein. An end plate 68 welded at one end of the member 64 defines a closed end of the cavity, while its opposing upper end includes an open throat 70. A master piston and arm assembly 72 may be formed from aluminum or stainless steel, using either NC machining or the techniques described in U.S. Pat. No. 4,817,213, hereby incorporated by reference. In either case, special care is taken to insure that both the master piston 90 and the arm 91 of assembly 72 conform to desired tolerances. The outer cylindrical surface 74 of the arm 91 is machined for rotation about the block assembly 76 mounted to the base 62. As shown in FIG. 4, block assembly 76 comprises a lower block 78 and an upper block 80 removably connected thereto by bolts 82. The opposing semicylindrical surfaces on the upper and lower blocks thus rotatably engage the surface 74 on the arm 91, and provide for concentric rotation of the master piston/arm assembly 72 with respect to the central axis of the block assembly. A vent plug 84 is threaded to the end plate 68, and has its end surface 86 extending into the chamber 66.

A mold-forming polymeric material 88 is placed within the chamber 66, as shown in FIG. 3, and the master piston/arm assembly 72 is rotated so that the master piston 90 engages the end surface 86 of the plug 84 (see FIG. 4), thereby displacing the polymeric material 88 about the master piston 90. Any excess material 88 overflows from the open end 70 of the member 64, and may discarded. The center of gravity for the master piston/arm assembly 72 maintains the assembly in the position as shown in FIG. 4 during curing of the mold-forming material. The time and temperature required for curing will naturally depend on the selected material. Various natural or synthetic thermoplastic or thermosetting polymeric materials may be used for the mold forming material. Polyester-based and epoxy-based mold forming materials are suitable examples. Urethane has been successfully employed as the mold-forming material, and nylon has been considered as an alternative material.

Figure 6:
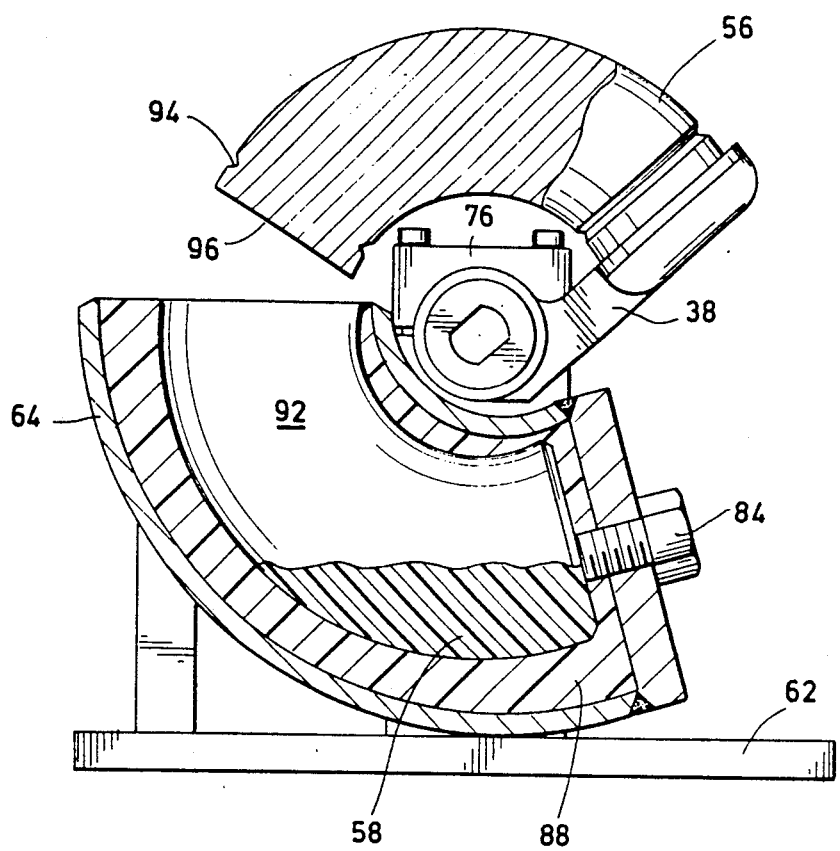
FIG. 6 is a pictorial view, partially in cross-section, illustrating a fixture with a moldable polymeric material placed within a master piston cavity, and with a production arm and piston core rotatably mounted to the fixture.

After the mold-forming material 88 has cured, the vent plug 84 may be partially unthreaded or completely removed. The master piston and arm assembly 72 may then be rotated out of the generally tubular-shaped member 64, and returned to the position as shown in FIG. 3. The mold-forming material 88 therefore defines an arcuate master chamber 92, as shown in FIG. 6, which conforms to the configuration of the master piston 90. The master piston and arm assembly may then be removed from the block assembly 76 and set aside for possible subsequent use in forming a similar arcuate master chamber in another fixture. It should be understood, however, that the fixture as shown in FIG. 6 with the cured mold forming material 88 may be repeatedly used for forming multiple rotary pistons for use in rotary actuators.

Figure 7:
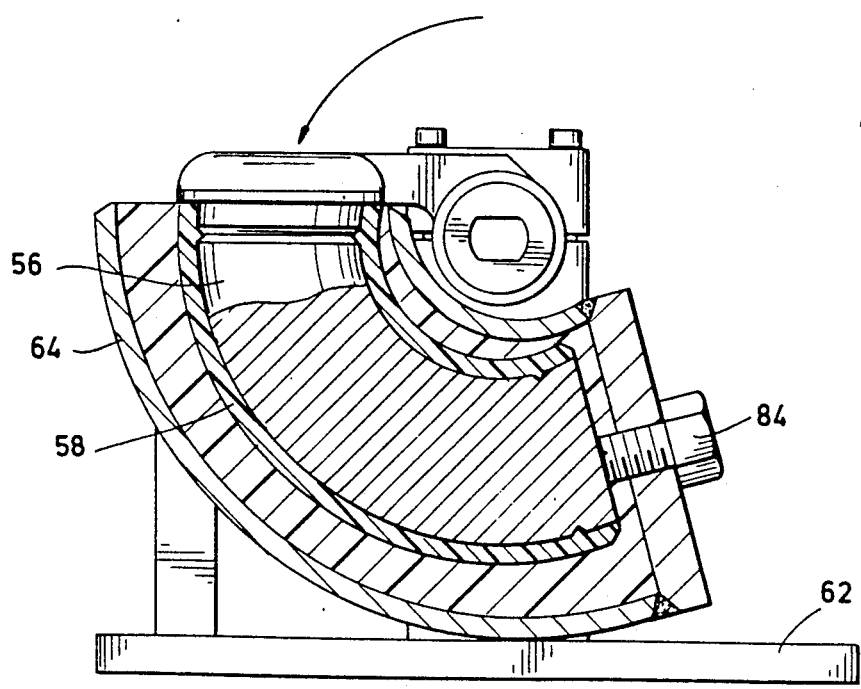
FIG. 7 is a pictorial view, partially in cross-section, of the assembly shown in FIG. 6 with the production arm and piston core rotated for forming a polymeric material sheath about the metal core of the piston.

The unitary production piston core 56 and arm 38 may now be rotatably mounted on the block 76, and the vent plug 84 returned to its tightened position. A moldable polymeric material 58 is placed within the chamber 92 for forming the sheath about the piston core 56. Any suitable polymeric material may be selected from the general category of materials previously described for the mold-forming material 88, and the selected material 58 may be of the same or a different composition than the material 88. One or more recesses, such as annular grooves 94, may be cast or machined into the body of the piston core 56. The grooves 94 are filled with the polymeric material 58 as the piston core 56 is rotated to the position shown in FIG. 7, thereby displacing the polymeric material to form the sheath 58 about the piston core 56. The planar end surface 96 of the piston core engages both the end 86 of the plug 84 and the planar end surface 87 of the chamber 92, so that the free end of the piston is not substantially covered with the material 58.

FIGS. 8-10 depict removal of another embodiment of a rotary piston 132 from the fixture. After curing, the vent plug is again preferably unthreaded to prevent the formation of a vacuum as the production piston and arm are rotated out of the master chamber 92. The upper block 80 is then removed, and the production piston 132 and arm 138 are released from the fixture. After inspection and removal of any excess or flash material, the piston and arm are ready for insertion within the rotary actuator housing as shown in FIG. 1.

The piston core depicted in FIG. 8 is a bent tubular member 156 which may be attached to an arm 138 using techniques previously discussed. An end plate 158 may be welded to the free end of the tubular member 156 to form a sealed void within the metal piston core. Other operations, including the formation of the polymeric sheath 58 about the piston core, may be performed as previously disclosed. The void 160 within the tubular member 156 and between the arm 138 and the end plate 158 reduces the weight and thus the material cost of the piston.

Figure 11:
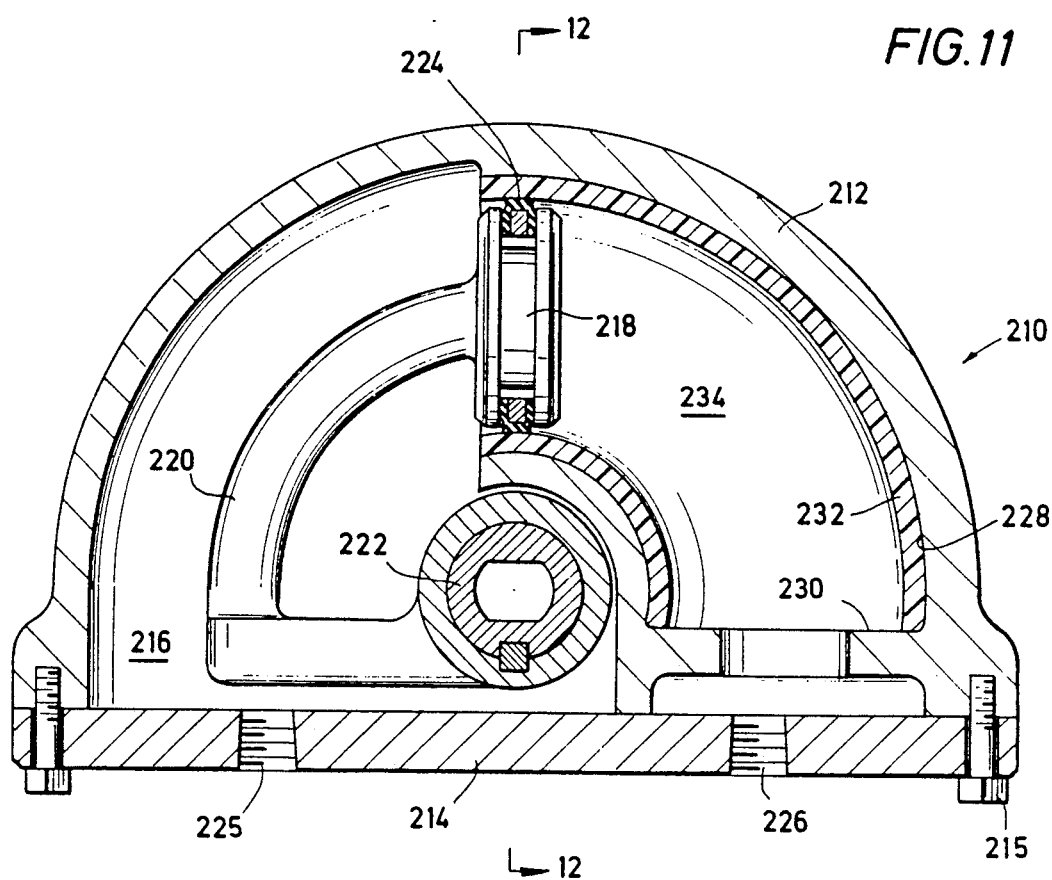
FIG. 11 is a pictorial view, partially in cross-section, illustrating another embodiment of a rotary actuator according to the present invention.
Figure 12:
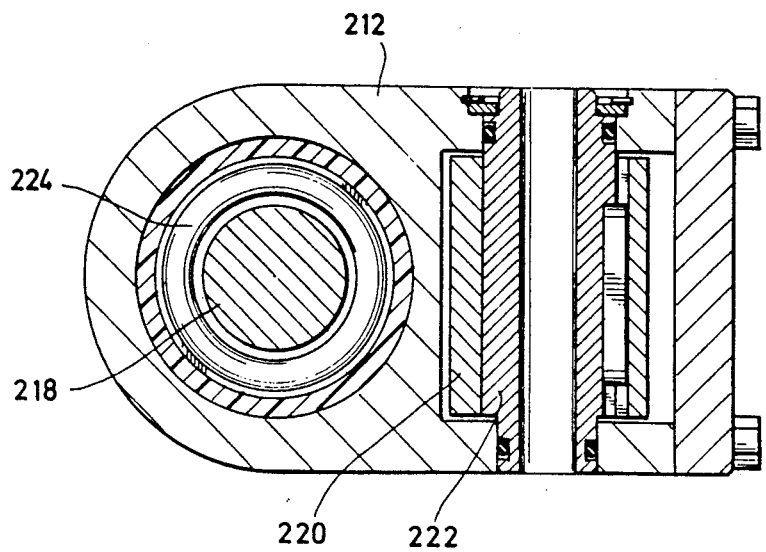
FIG. 12 is a cross-sectional view taken along lines 12—12 in FIG. 11.

FIGS. 11 and 12 illustrate another embodiment of a rotary actuator 210. A monolithic housing portion 212 may be secured to a planar side portion 214 by bolts 215. A cavity 216 is formed within the housing to receive piston 218 and an arm 220 which interconnects the piston to the shaft 222. An annular seal 224 is carried on the piston. Ports 225 and 226 allow pressurized fluid to reciprocate the piston and thus rotate the actuator shaft as previously disclosed.

The housing 212 may be cast with a generally arcuate chamber therein defined by interior surface 228 and end surface 230. The surface 228 does not, however, have the finish nor the concentricity to reliably seal with the seal 224 carried on the piston. A polymeric lining 232 is provided which defines a chamber 234 having the desired toroidal arc segment configuration and concentricity with respect to the shaft for maintaining reliable sealing engagement during reciprocation of the piston.

Figure 13:
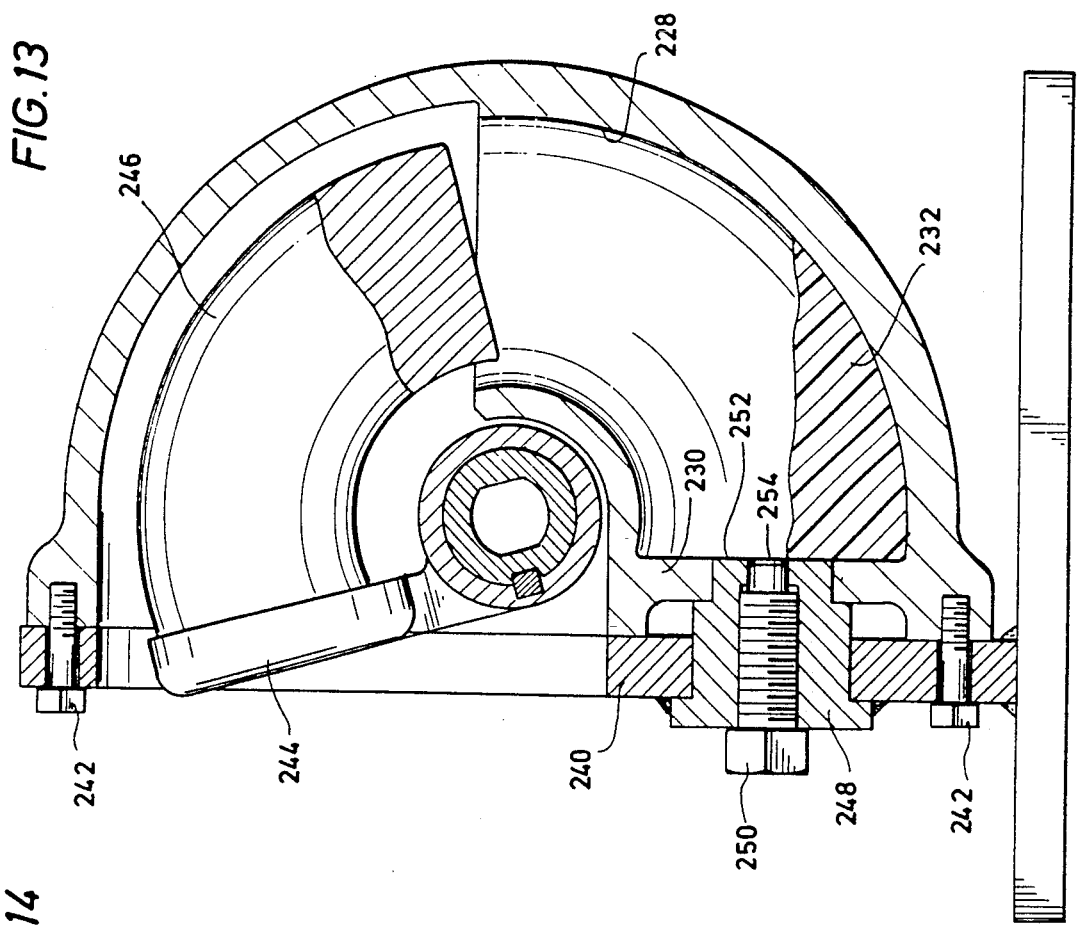
FIG. 13 is a pictorial view, partially in cross-section, illustrating a rotary actuator housing secured to a fixture, with a moldable polymeric material placed within the housing chamber and a master piston/arm assembly rotatably mounted to the housing.
Figure 14:
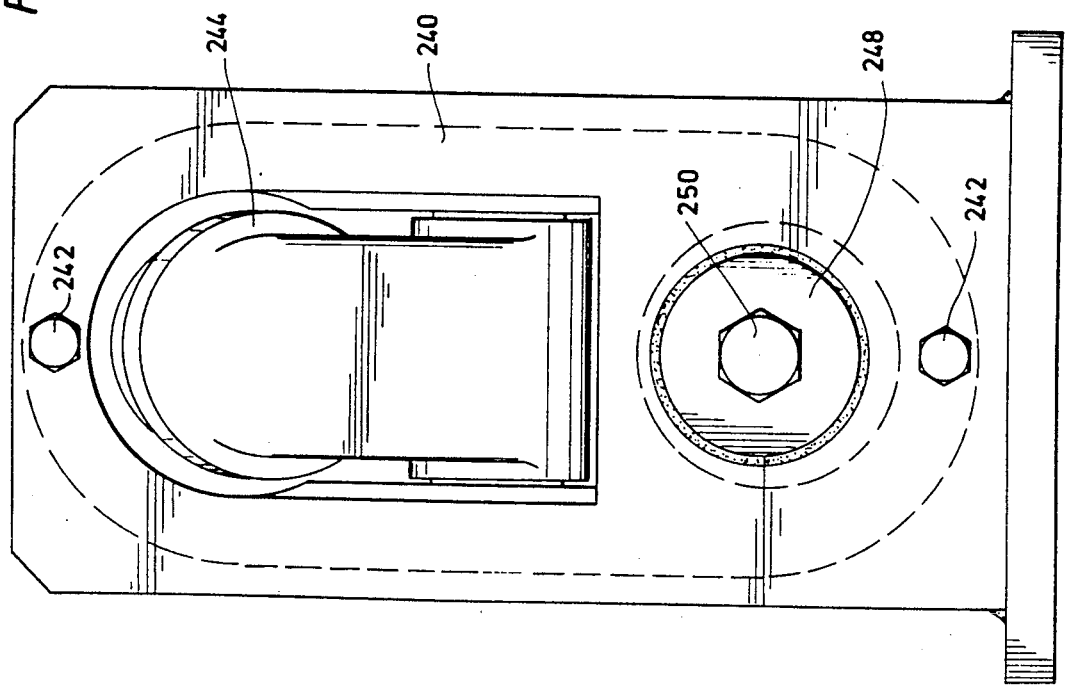
FIG. 14 is an end view of the apparatus shown in FIG. 13.

Referring to FIGS. 13 and 14, the housing portion 212 may be temporarily mounted to fixture 240 by bolts 242. A cap 248 is secured to the fixture, and includes a vent plug 250 threaded thereto. End face 252 of cap 248 and the end face 254 of vent plug 250 are positioned within the plane of the surface 230. A master arm 244 and a master piston 246 are rotatably mounted to the fixture 240, and a polymeric material 232 is placed within the housing.

Figure 16:
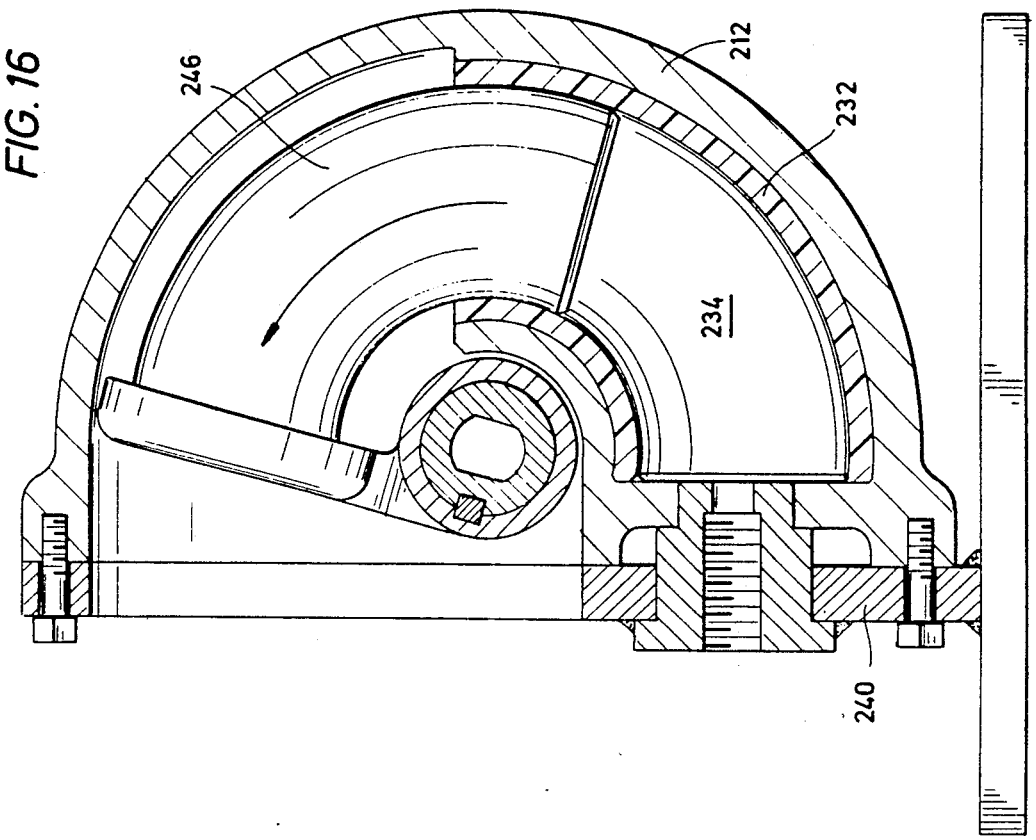
FIG. 16 is a pictorial view, partially in cross-section, illustrating removal of the master piston/arm assembly from the toroidal arc segment chamber within the rotary actuator housing.
Figure 15:
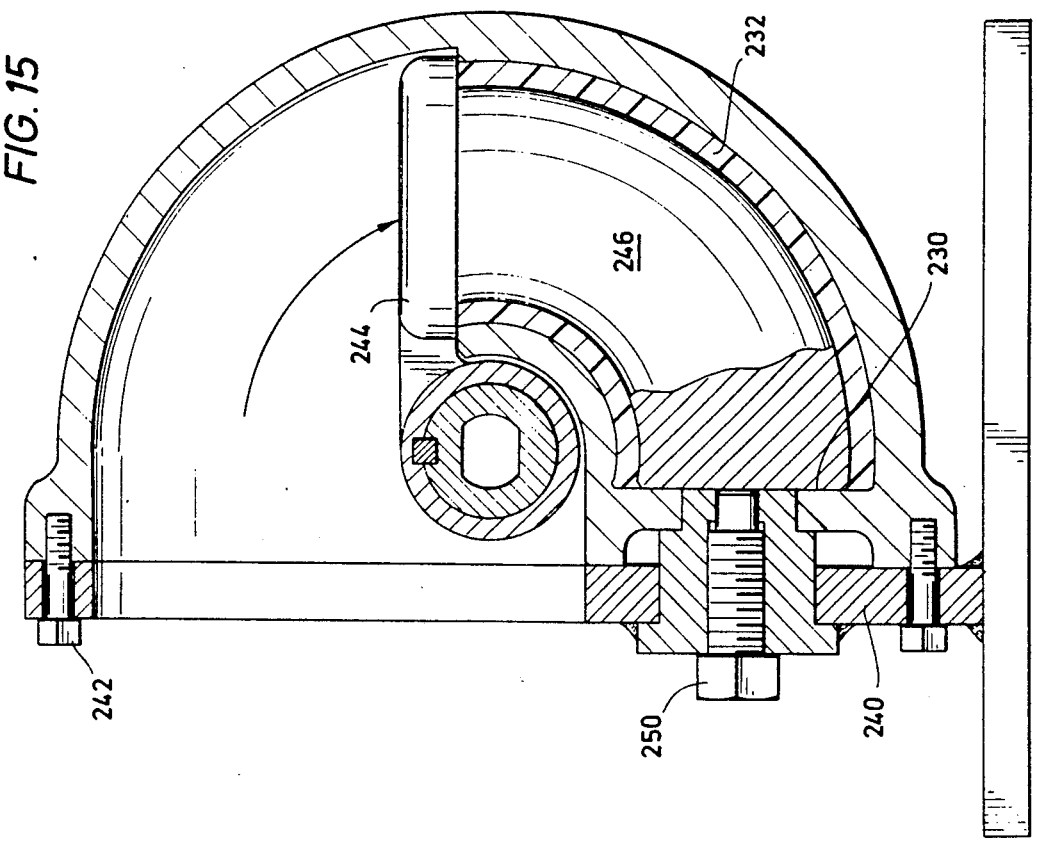
FIG. 15 is a pictorial view, partially in cross-section, illustrating the master piston/arm assembly rotated within the housing chamber to form a polymeric material lining which defines a toroidal arc segment chamber within the rotary actuator housing.

Master piston 246 is then rotated to engage the end surface 230, as shown in FIG. 15, thereby displacing the polymeric material and forming the liner 232. Excess material adjacent the arm 244 may be easily removed before the polymeric material cures. After curing, the vent plug 250 may be removed, and the master piston 246 rotated toward its original position, as shown in FIG. 16, then removed from the housing portion 212. The liner 232 is thus formed with the desired configuration of the master piston. Housing 212 with the liner 232 may then be removed from the fixture 240, and used to assemble the rotary actuator as shown in FIG. 12.

The foregoing disclosure and description of the invention is illustrative and explanatory thereof, and various changes in the method steps and the depicted apparatus may be made within the scope of the appended claims and without departing from the spirit of the invention.

What is claimed is:

1. A method of forming a toroidal arc segment piston for use in a rotary actuator including a housing defining an arcuate chamber therein, an actuator shaft journaled within the housing and rotatable in response to movement of the piston, a fluid inlet to introduce pressurized fluid into the housing to effect movement of the piston, and a seal for dynamic sealing engagement between the housing and the piston, the method comprising:
    (a) forming a fixture defining an arcuate master chamber therein having a toroidal arc segment configuration;
    (b) inserting a moldable polymeric material within the arcuate master chamber;
    (c) rotatably mounting a metal piston core with respect to the fixture;
    (d) rotating the metal piston core into the arcuate master chamber to form a sheath about the metal piston core filled with the polymeric material;
    (e) curing the moldable polymeric material sheath about the metal piston core; and
    (f) thereafter rotating the metal piston core and the cured polymeric sheath out of the master piston chamber within the fixture.

2. The method as defined in claim 1, further comprising:
    affixing an arm to the metal piston core;
    machining the arm for interconnection within the actuator housing; and
    step (c) comprises rotatably mounting the machined arm and the affixed metal piston core to the fixture.

3. The method as defined in claim 2, further comprising:
    casting the arm and the metal piston core as a monolithic unit.

4. The method as defined in claim 1, wherein step (a) comprises:
    providing a generally arcuate chamber within the fixture:
    placing a mold-forming material within the generally arcuate chamber;
    rotatably mounting a master piston with respect to the fixture:
    rotating the master piston into the generally arcuate chamber to displace the mold-forming material about the master piston;
    curing the mold-forming material within the fixture; and
    rotating the master piston out of the mold-forming material such that the cured mold-forming material defines the arcuate master chamber within the fixture.

5. The method as defined in claim 1, further comprising:
    forming a recess within an outer surface of the metal piston core to receive the polymeric material and thereby interconnect the polymeric sheath with the metal piston core.

6. The method as defined in claim 1, further comprising:
    selecting the moldable polymeric material from a group consisting of urethane and nylon.

7. The method as defined in claim 1, further comprising:
    securing an arm to one end of the metal piston core such that the metal piston core is cantilevered from the arm; and
    positioning an opposing planar free end of the metal piston core in planar engagement with an end surface of the arcuate master chamber, such that the free end of the metal piston core is substantially uncovered with the cured polymeric material.

8. The method as defined in claim 1, further comprising:
    the arcuate master chamber has an open end for receiving the metal piston core and an opposing closed end; and
    venting the closed end of the arcuate master chamber prior to performing step (f).

9. A toroidal arc segment piston formed according to the method defined in claim 1.

10. A rotary actuator, comprising:
    a housing defining an arcuate chamber therein;
    a toroidal arc segment piston disposed within the housing for reciprocable movement within the arcuate chamber, the piston including a metal core and an outer polymeric material sheath;

a fluid inlet to introduce pressurized fluid into the housing to effect movement of the piston in a first direction;

return means to effect movement of the piston in an opposing second direction;

a shaft journaled within the housing;

an arm interconnecting the metal core and the shaft such that the shaft is rotated in response to movement of the piston; and a seal for effecting dynamic sealing between the outer polymeric material sheath and the housing.

11. The rotary actuator as defined in claim 10, wherein the arm and metal core are a monolithic unit.

12. The rotary actuator as defined in claim 10, wherein the metal core of the piston comprises:

a tubular member having a hollow interior, the tubular member being secured at one end to the arm and having an opposing free end; and an end plate secured to the free end of the tubular member.

13. The rotary actuator as defined in claim 10, further comprising:

an annular groove within the housing for receiving the seal; and a recess within an outer surface of the metal core for receiving a portion of the polymeric material sheath to interconnect the metal core and the polymeric material sheath.

14. A rotary actuator as defined in claim 10, further comprising:

an adjustable stop member mounted on the housing for engagement with an end surface of the metal core opposite the arm.

15. A method of forming a rotary actuator housing for a rotary actuator including an actuator piston movable within the housing in response to the fluid pressure for rotating an actuator shaft interconnected with the piston, the method comprising:

forming a housing having a generally arcuate chamber therein;

rotatably mounting a master piston with respect to the housing;

inserting a moldable polymeric material within the arcuate chamber;

rotating the master piston into the arcuate chamber to form an annular sheath between the master piston and the generally arcuate chamber for the polymeric material;

thereafter rotating the master piston out of the housing to form a chamber having a toroidal arc segment configuration defined by the curved polymeric material for receiving the actuator piston; and removing the master piston from the housing.

16. The method as defined in claim 15, further comprising:

the generally arcuate chamber formed in the housing having an open end for receiving the master piston and an opposing closed end; and positioning an end surface of the master piston in planar engagement with the end surface of the closed end of the generally arcuate chamber, such that the end surface of the master piston is substantially free of moldable polymeric material.

17. The method as defined in claim 16, further comprising:

venting the closed end of the arcuate chamber prior to rotating the master piston out of the housing.

18. The method as defined in claim 15, further comprising:

mounting the housing to a fixture; and rotatably mounting the master piston on the fixture.

19. The method as defined in claim 15, further comprising:

selecting the moldable polymeric material from a group consisting of urethane and nylon.

20. An actuator housing formed according to the method as defined in claim 15.

* * * * *